(12) United States Patent
Mattioli et al.

(10) Patent No.: US 10,093,484 B2
(45) Date of Patent: Oct. 9, 2018

(54) FEEDING UNIT FOR FEEDING SEALED PACKS OF POURABLE FOOD PRODUCTS

(71) Applicant: TETRA LAVAL HOLDINGS & FINANCE S.A., Pully (CH)

(72) Inventors: Giorgio Mattioli, Modena (IT); Richard John Pedretti, Formigine (IT); Dino Neri, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/327,542

(22) PCT Filed: Sep. 9, 2015

(86) PCT No.: PCT/EP2015/070587
§ 371 (c)(1),
(2) Date: Jan. 19, 2017

(87) PCT Pub. No.: WO2016/058755
PCT Pub. Date: Apr. 21, 2016

(65) Prior Publication Data
US 2017/0166401 A1    Jun. 15, 2017

(30) Foreign Application Priority Data
Oct. 13, 2014 (EP) .................... 14188605

(51) Int. Cl.
*B65G 19/02* (2006.01)
*B65G 43/10* (2006.01)
(Continued)

(52) U.S. Cl.
CPC ............... *B65G 15/16* (2013.01); *B65B 9/20* (2013.01); *B65B 51/10* (2013.01); *B65B 61/06* (2013.01); *B65B 61/24* (2013.01); *B65G 15/44* (2013.01)

(58) Field of Classification Search
CPC ........ B65G 19/02; B65G 43/10; B65G 37/00; B65B 35/24; B65B 43/52
(Continued)

(56) References Cited

U.S. PATENT DOCUMENTS 3,575,278 A    4/1971 Hoffmann et al.
4,019,624 A *  4/1977 Torres .................... B65G 23/38
                                              198/459.8
(Continued)

FOREIGN PATENT DOCUMENTS

EP    0 061 663 A2    10/1982
EP    0 887 261 A1    12/1998
EP    2 468 641 A1     6/2012

OTHER PUBLICATIONS

International Search Report (PCT/ISA/210) dated Jan. 21, 2015, by the European Patent Office as the International Searching Authority for International Application No. PCT/EP2015/070587.
(Continued)

*Primary Examiner* — Douglas A Hess
(74) *Attorney, Agent, or Firm* — Buchanan Ingersoll & Rooney PC

(57) ABSTRACT

A feeding unit for receiving sealed packs from a forming unit arranged to form the packs and feed the packs to a folding unit arranged to fold the packs so as to obtain folded packages comprises a feeding conveyor having at least one carrying element arranged for delivering the packs to the folding unit at an outlet region of the feeding unit, the feeding unit further comprising a braking conveyor arranged for slowing down the packs so that the packs are kept in contact with the at least one carrying element at the outlet region.

19 Claims, 5 Drawing Sheets

(51) Int. Cl.
*B65G 37/00* (2006.01)
*B65B 35/24* (2006.01)
*B65B 43/52* (2006.01)
*B65G 15/16* (2006.01)
*B65B 9/20* (2012.01)
*B65B 61/24* (2006.01)
*B65B 51/10* (2006.01)
*B65B 61/06* (2006.01)
*B65G 15/44* (2006.01)

(58) Field of Classification Search
USPC ........ 198/575, 576, 577, 717, 722, 727, 728
See application file for complete search history.

(56) References Cited

U.S. PATENT DOCUMENTS

| | | | | |
|---|---|---|---|---|
| 4,124,113 A * | 11/1978 | Trees | ............... | B65G 47/30 198/461.1 |
| 4,310,088 A * | 1/1982 | Tibbals | ............... | B65G 47/082 198/419.1 |
| 4,372,440 A * | 2/1983 | Ringis | ............... | B65G 23/44 198/728 |
| 4,443,995 A * | 4/1984 | Myers | ............... | B65G 15/16 198/418.7 |
| 4,561,546 A * | 12/1985 | Maroney | ............... | B07C 5/10 198/728 |
| 4,682,684 A * | 7/1987 | Lothman | ............... | B65G 47/31 198/459.8 |
| 4,708,237 A * | 11/1987 | Buisson | ............... | A24C 5/34 198/575 |
| 4,925,006 A * | 5/1990 | Lentz | ............... | B65G 19/02 198/419.3 |
| 5,419,425 A * | 5/1995 | Goater | ............... | B27B 31/006 198/461.3 |
| 5,529,167 A * | 6/1996 | Gabriele | ............... | B65G 47/82 198/456 |
| 5,785,804 A * | 7/1998 | Kovacs | ............... | B65B 43/465 156/216 |
| 6,698,576 B2 * | 3/2004 | Hahnel | ............... | B65G 17/26 198/469.1 |
| 7,581,637 B2 * | 9/2009 | Lenherr | ............... | B65L 335/24 198/459.8 |
| 9,776,750 B2 * | 10/2017 | May | ............... | B65B 17/025 |

OTHER PUBLICATIONS

Written Opinion (PCT/ISA/237) dated Jan. 21, 2015, by the European Patent Office as the International Searching Authority for International Application No. PCT/EP2015/070587.

* cited by examiner

FEEDING UNIT FOR FEEDING SEALED PACKS OF POURABLE FOOD PRODUCTS

TECHNICAL FIELD

The present invention relates to a feeding unit for receiving sealed pillow-shaped packs of pourable food products from a forming unit arranged to form the packs and feed the packs to a folding unit arranged to fold the packs so as to obtain folded packages.

BACKGROUND OF INVENTION

As is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated sheet packaging material.

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging-material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The packaging machines comprise a forming unit, in which the tube is filled continuously downwards with the sterilized or sterile-processed food product, and is sealed and then cut along equally spaced cross sections to form pillow packs, which are then fed to a folding unit to form the finished, e.g. substantially parallelepiped-shaped packages.

More specifically, the pillow packs substantially comprise a parallelepiped-shaped main portion; and a top end portion and a bottom end portion, opposite to each other and projecting laterally on opposite sides of the main portion and defining respective triangular end flaps to be folded onto the main portion.

A longitudinal sealing strip, formed when sealing the packaging material to form the vertical tube, extends along the pillow packs; and the top end portion and bottom end portion of each pillow pack have respective transverse sealing strips perpendicular to the longitudinal sealing strip and defining respective end flaps projecting from the top and bottom of the pack.

The top end portion and the bottom end portion of each pillow pack taper towards the main portion from the respective end flaps.

Folding units are known, which comprise a chain conveyor for feeding pillow packs continuously along a predominantly straight horizontal forming path from a supply station to an output station. The chain conveyor comprises a plurality of paddles, each arranged for supporting and conveying a corresponding pillow pack along the forming path. The paddies also contribute to fold the pillow packs to obtain respective packages. The folding units also comprise a plurality of folding devices, which cooperate cyclically with each pillow pack along the forming path to flatten the respective top end portion and bottom end portion of the pillow pack and fold the respective end flaps onto the top end portion and bottom end portion.

The folding units comprise heating means arranged for heating the pillow packs and melting the plastic material forming the outer plastic layer of the pillow packs at the top end portion and bottom end portion.

In practice, the pillow packs are usually formed and sealed with their longitudinal axis arranged vertically. The newly formed pillow packs are subsequently cut from the tube and let slide along a curved-profile chute so as to be brought from the vertical position to a substantially horizontal position, in which they are received by a feeding unit, arranged immediately downstream of the chute and which drives the pillow packs to the folding unit.

Once the pillow packs are cut from the tube, they move down to the chute and advance along the chute by gravity.

The feeding unit comprises two guides that extend between an inlet zone, where the packs coming from the chute are received, and an outlet zone, where the packs are delivered to the folding unit.

The feeding unit further comprises a conveyor belt and a plurality of carriers projecting from the conveyor belt and arranged to interact with the packs to advance the packs along the guides.

The conveyor belt is wound around a first wheel and a second wheel, the first wheel and the second wheel having substantially horizontal axes. In this way, the conveyor belt has an upper active branch and a lower return branch, the carriers of the upper active branch passing through a gap defined between the two guides and pushing the packs.

A drawback of the known packaging machines is that the feeding unit may deliver the packs to the folding unit in an improper way.

The carriers of the feeding unit are synchronized with the paddles of the folding unit.

In order to be synchronised with the paddles of the folding unit, the packs have to abut against the respective carriers. It may happen, however, that the packs are not in contact with the carriers.

This may be due to the fact that the packages are released from the forming unit to the feeding unit by gravity. The time the packs are released and the position of the folding unit at which they are received are influenced by various factors, in particular sticking of the packs to the sealing device that carries out the transversal sealing or to the cutter that separates the packs form the tube.

In addition, the packs—instead of being permanently in contact with the carriers—may receive a series of hits, or knocks, by the carriers and advance in a succession of "impulses" along the guides.

The packs, therefore, slide on the guides and arrive at the folding unit "too early".

In this way, the packs may bump against the chain conveyor of the folding unit, bounce backwards, i.e. towards the feeding unit, and being clamped by the folding devices. In this case, the packs are damaged and a jam may occur in the packaging machine.

The known feeding units comprise pushing elements arranged for pushing the packs towards the carriers and keeping the packs in contact with the carriers.

In one case, the pushing elements comprise brushes.

In another case, the pushing elements comprise springs.

A drawback of the pushing elements is that their action is based on friction. Water or dirt may change the friction between the pushing element and the packs, and between the guides and the packs, so reducing the effectiveness of the pushing elements.

In other words, the pushing elements—due to the variations of the friction—are not reliable and repeatable, especially if the packaging machines operate at a very high output rate, i.e. the feeding unit conveys packs at a very high speed.

In addition, the brushes may cause hygiene problems since particles of dirt may be trapped in the bristles and are difficult to be removed.

Furthermore, the springs may scratch the packs.

DISCLOSURE OF INVENTION

An object of the invention is to improve the known packaging machines, in particular the feeding unit that receives the packs from the forming unit and transfers the packs to the folding unit.

Another object of the invention is to improve the way in which the feeding unit delivers the packs to the forming unit.

Another object of the invention is to reduce the risk that the packages coming from the feeding unit bounces against the paddles of the forming unit and are clamped—and therefore crushed—by the folding devices of the folding unit.

Another object of the invention is to improve the synchronization of the packs coming from the feeding unit with the paddles of the forming unit.

Another object of the invention is to provide a feeding unit that is efficient and reliable even when used in high speed packaging machines.

According to the invention, there is provided a feeding unit for receiving sealed packs of pourable food products from a forming unit arranged to form the packs and feed the packs to a folding unit arranged to fold the packs so as to obtain folded packages, as claimed in claim 1.

BRIEF DESCRIPTION OF THE DRAWINGS

Some preferred, non-limiting embodiments of the invention will be described by way of example with reference to the accompanying drawings, in which.

DETAILED DESCRIPTION OF PREFERRED EMBODIMENTS

Figure 1:
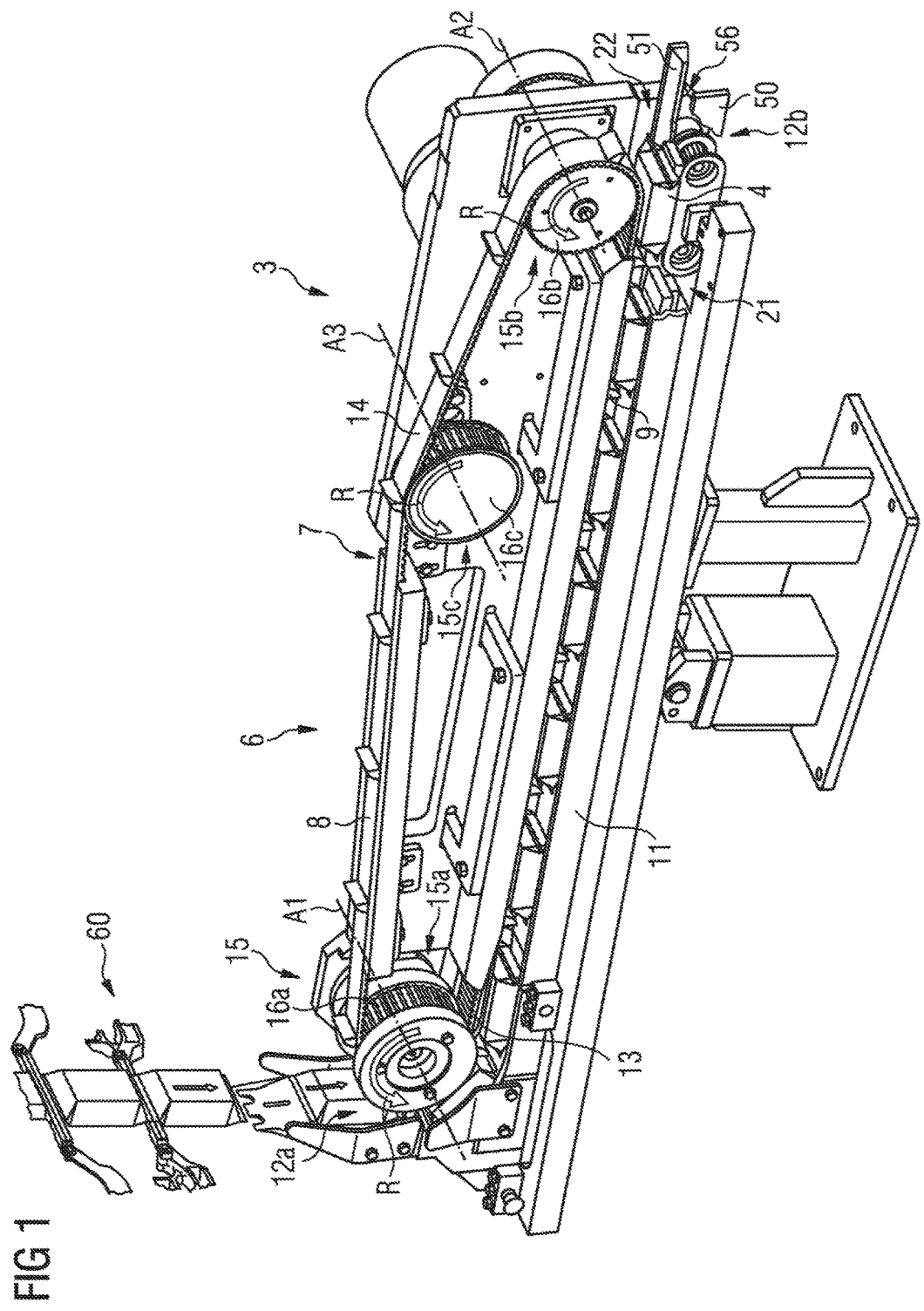
FIG. 1 is a perspective view of a feeding unit according to the invention.

With reference to FIGS. 1 to 4, a packaging machine 1 is shown comprising a forming unit 60, a folding unit 2 and a feeding unit 3 interposed between the forming unit 60 and the folding unit 2.

The forming unit 60 folds, fills and seals a packaging material to obtain pillow-shaped packs 4. In particular, the forming unit 60 continuously produces the packs 4 from a tube of packaging material, (not shown).

The tube is formed in known manner by longitudinally folding and sealing a web of heat-seal sheet material which may comprise a base layer for stiffness and strength, which may be formed by a layer of fibrous material, e.g. paper, or of mineral-filled polypropylene material, and a number of layers of heat-seal plastic material, e.g. polyethylene film, covering both sides of the base layer. In the case of an aseptic package for long-storage products, such as UHT milk, the packaging material may also comprises a layer of gas- and light-barrier material, e.g. an aluminium foil or an ethyl vinyl alcohol (EVOH) foil, which is superimposed on a layer of heat-seal plastic material, and is in turn covered with another layer of heat-seal plastic material forming the inner face of the package eventually contacting the food product.

The tube of packaging material is then filled with the food product, and sealed and cut along equally spaced cross sections to form the packs 4.

Figure 5:
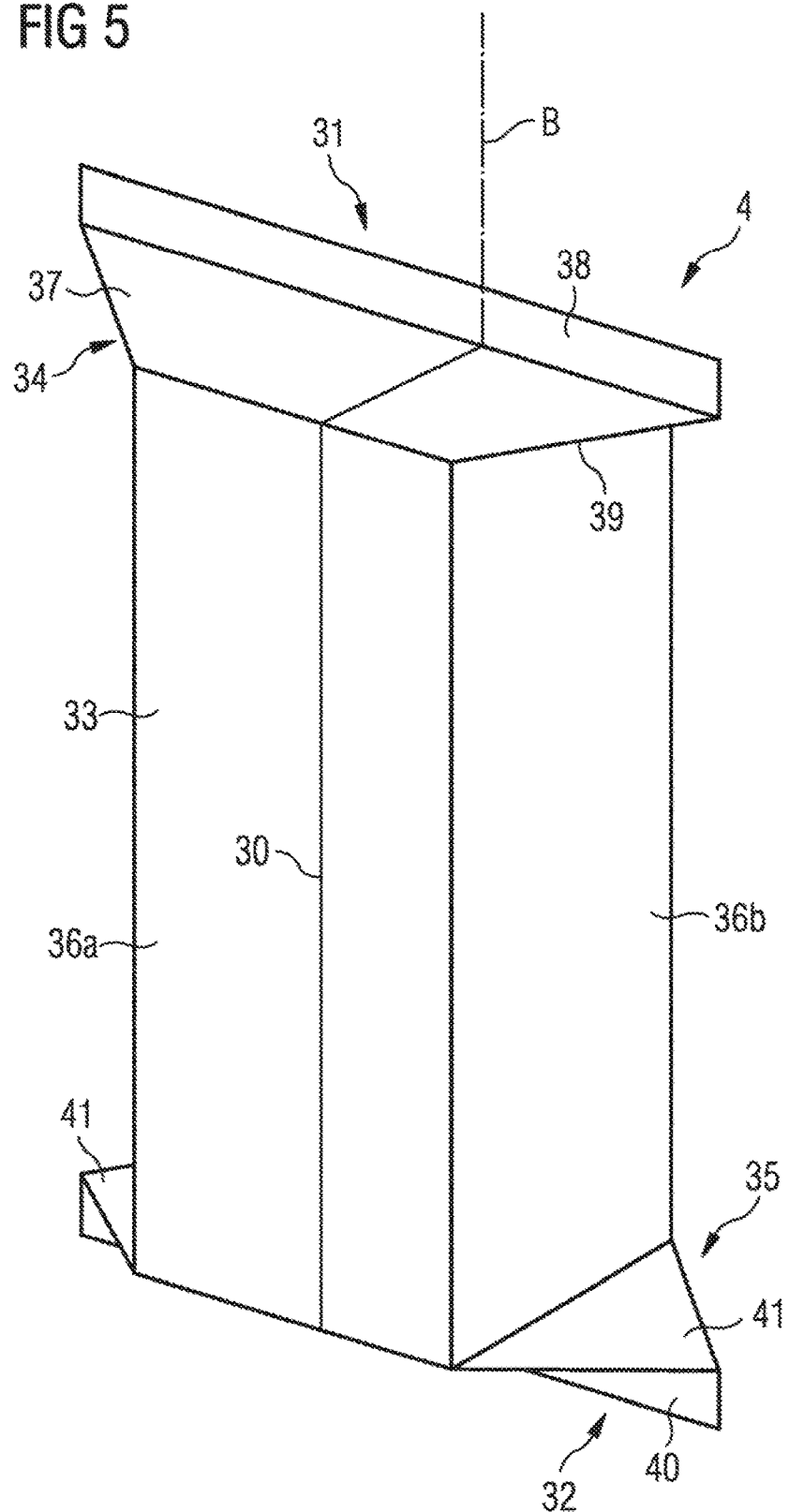
FIG. 5 is a perspective view of a pack to be transferred by the feeding unit of FIG. 1.

With reference to FIG. 5, an embodiment of a pack 4 is shown which has a longitudinal sealing band 30, formed to produce the tube of packaging material from the web folded into a cylinder and extending along one side of the pack 4. The pack 4 is closed at opposite ends by a first transversal sealing band 31 and a second transversal sealing band 32 perpendicular to and joined to the longitudinal sealing band 30.

Each pack 4 has an axis B, and comprises a main body 33, a first end portion 34 and a second end portion 35 tapering from the main body 33 towards—respectively—the first transverse sealing band 31 and the second transverse sealing band 32.

The main body 33 of the pack 4 is bounded laterally by two first lateral walls 36a and two second lateral walls 36b which are alternate to each other.

The first end portion 34 and the second end portion 35 are each defined by two walls 37, each substantially in the form of an isosceles trapezium, which slope slightly towards each other with respect to a plane perpendicular to axis B, and have minor edges defined by opposite edges of respective wall 36a, and major edges joined to each other by the respective first transversal sealing band 31 and second transversal sealing band 32.

The longitudinal sealing band 30 extends between the first transverse sealing band 31 and the second transverse sealing band 32, and along the whole of one wall 36a and the corresponding walls 37 on the same side as the wall 36a.

The first end portion 34 comprises a substantially elongated rectangular first end fin 38, formed by the first transversal sealing band 31, and projecting in the direction of axis B from the pack 4; and two substantially triangular first flaps 39, projecting laterally on opposite sides of the main body 33, and defined by end portions of the walls 37 and by corresponding triangular end portions of the lateral walls 36b.

Similarly, the second end portion 35 comprises a substantially elongated rectangular second end fin 40, formed by the second transversal sealing band 32, and projecting in the direction of axis B from the pack 4; and two substantially triangular second end flaps 41, projecting laterally on opposite sides of the main body 33, and defined by end portions of the walls 37 and by corresponding triangular end portions of the lateral walls 36b.

More precisely, each of the first end fin 38 and second end fin 40 extends along a direction orthogonal to axis B.

To form a package from a pack 4 the folding unit 2 presses the first end portion 34 and the second end portion 35 down flat towards each other, and at the same time folds the first end fin 38 onto the flattened first end portions 34 and the second end fin 40 onto the flattened second end portion 35.

The folding unit 2 folds the second flaps 41 onto top ends of respective walls 36b towards the first end portion 34 and folds the first flaps 39 onto the previously folded first end fin 38, on the opposite side of the second end portion 35.

The feeding unit 3 receives the packs 4 from the forming unit 60 and transfers the packs 4 to the folding unit 2.

The folding unit 2 comprises a chain conveyor 52 that advances the packs 4. The chain conveyor 52 comprises a plurality of paddles 53, each paddle 53 being connected to a corresponding link element 54 of the chain conveyor 52. The folding unit 2 further comprises a plurality of folding devices that folds the packs 4 while the packs 4 are advanced by the chain conveyor 52.

The feeding unit 3 comprises a feeding conveyor 6 having a carrying arrangement 7 movable cyclically along an advancing path P. The carrying arrangement 7 is arranged to carry the packs 4 towards the folding unit 2.

The carrying arrangement 7 comprises a flexible conveying element 8 and at least one carrying element 9 projecting from the flexible conveying element 8. In particular, as shown in FIGS. 1 to 4, the carrying arrangement 7 comprises a plurality of carrying elements 9. The carrying elements 9 are arranged at a constant distance on the flexible conveying element 8.

In the embodiment shown, the flexible conveying element 8 comprises a toothed belt 10.

The feeding conveyor 6 further comprises a guide arrangement 11 which receives the packs 4 and on which the packs 4 slide along the advancing path P.

The feeding conveyor 6 comprises an inlet region 12a, at which the packs 4 reach the advancing path P, and an outlet region 12b, at which the packs 4 leave the advancing path P and are transferred to the folding unit 2.

The flexible conveying element 8 comprises a lower active branch 13 facing towards the guide arrangement 11 and an upper return branch 14, the upper return branch 14 and the guide arrangement 11 being positioned on opposite sides of the lower active branch 13.

The flexible conveying element 8 is shaped as a loop and is partially wound on rotatable bodies 15, in the example show a first rotatable body 15a, a second rotatable body 15b and a third rotatable body 15c, at least one of which is motorized. The first rotatable body 15a, the second rotatable body 15b, and the third rotatable body 15c rotate in a rotation direction R and drive the lower active branch 13 along path P. The rotatable body 15a rotates around an axis M that is substantially horizontal. Similarly, the second rotatable body 15b rotates around a second axis A2 that is substantially horizontal. In the same way, the third rotatable body 15c rotates around a third axis A3 that is substantially horizontal.

In the embodiment shown, the first rotatable body 15a is a first toothed wheel 16a meshing which the toothed belt 10. Similarly, the second rotatable body 15b is a second toothed wheel 16b meshing with the toothed belt 10. In the same way, the third rotatable body 15c is a third toothed wheel 16c meshing with the toothed belt 10.

The feeding unit 3 further comprises a braking conveyor 17 arranged for slowing down the packs 4 so that the packs 4 are kept in contact with the carrying elements 9 when the feeding unit 3 delivers the packs 4 to the folding unit 2.

The braking conveyor 17 comprises a flexible conveying arrangement 18 positioned at the outlet region 12b and at least one braking element 13 projecting from the flexible conveying arrangement 18. In particular, as shown in FIGS. 1 to 4, the braking conveyor 17 comprises a plurality of braking elements 19. The braking elements 19 are arranged at a constant distance on the flexible conveying arrangement 18.

In the embodiment shown, the flexible conveying arrangement 18 comprises a chain 20. In another embodiment the flexible conveying arrangement comprises a toothed belt.

The braking conveyor 17 and the feeding conveyor 6 are arranged on opposite sides of the guide arrangement 11.

The guide arrangement 11 defines a substantially horizontal plane. The flexible conveying arrangement 18 is positioned below the guide arrangement 11 and the flexible conveying element 8 is positioned above the guide arrangement 11.

The guide arrangement 11 comprises a first guide element 50 and a second guide element 51 positioned on opposite sides of the flexible conveying arrangement 18—and of the flexible conveying element 8—so that a gap 56 is defined between the first guide element 50 and the second guide element 51.

The braking elements 19 project from the flexible conveying arrangement 18 through the gap 56 to interact with the packs 4.

The braking conveyor 17 comprises an inlet area 21, at which the packs 4 reach the flexible conveying arrangement 18, and an outlet area 22, at which the packs 4 leave the flexible conveying arrangement 18.

The flexible conveying arrangement 8 comprises a working branch 23 facing towards the guide arrangement 11 and a return branch 24, the return branch 24 and the guide arrangement 11 being positioned on opposite sides of the working branch 23.

The flexible conveying arrangement 18 is shaped as a loop and is partially wound on a rotatable element 25 and a further rotatable element 26. The rotatable element 25 and the further rotatable element 26 rotate in a rotation direction S and drive the working branch 23 along path P. The rotation direction S is opposite to the rotation direction R. The rotatable element 25 rotates around a rotation axis C1 that is substantially horizontal. Similarly, the further rotatable element 26 rotates around a further rotation axis C2 that is substantially horizontal.

In the embodiment shown, the rotatable element 25 is a sprocket 27 meshing with the chain 20. Similarly, the further rotatable element 26 is a further sprocket 28 meshing with the chain 20.

In case the flexible conveying arrangement comprises a toothed belt—as mentioned above—the rotatable element 25 and the further rotatable elements are toothed wheels meshing with the toothed belt.

The braking conveyor 17 comprises a driving arrangement (not shown) that drives the flexible conveying arrangement 18 along path P at an advancing speed.

The feeding conveyor 6 comprises a further driving arrangement (not shown) that drives the flexible conveying element 8 along path P at a further advancing speed.

The driving arrangement and the further driving arrangement are so configured that the advancing speed is lower than the further advancing speed, in other words, the flexible conveying arrangement 18 is slower than the flexible conveying element 8.

During operation, a pack 4 is produced by folding the packaging material, forming the tube, filling the tube with a food product and sealing the tube.

A cutting tool cuts the tube and separates the pack 4 from the tube.

Once removed from the tube, the pack 4 reaches the feeding unit 3 and is advanced on the guide arrangement 11 along path P.

Figure 2:
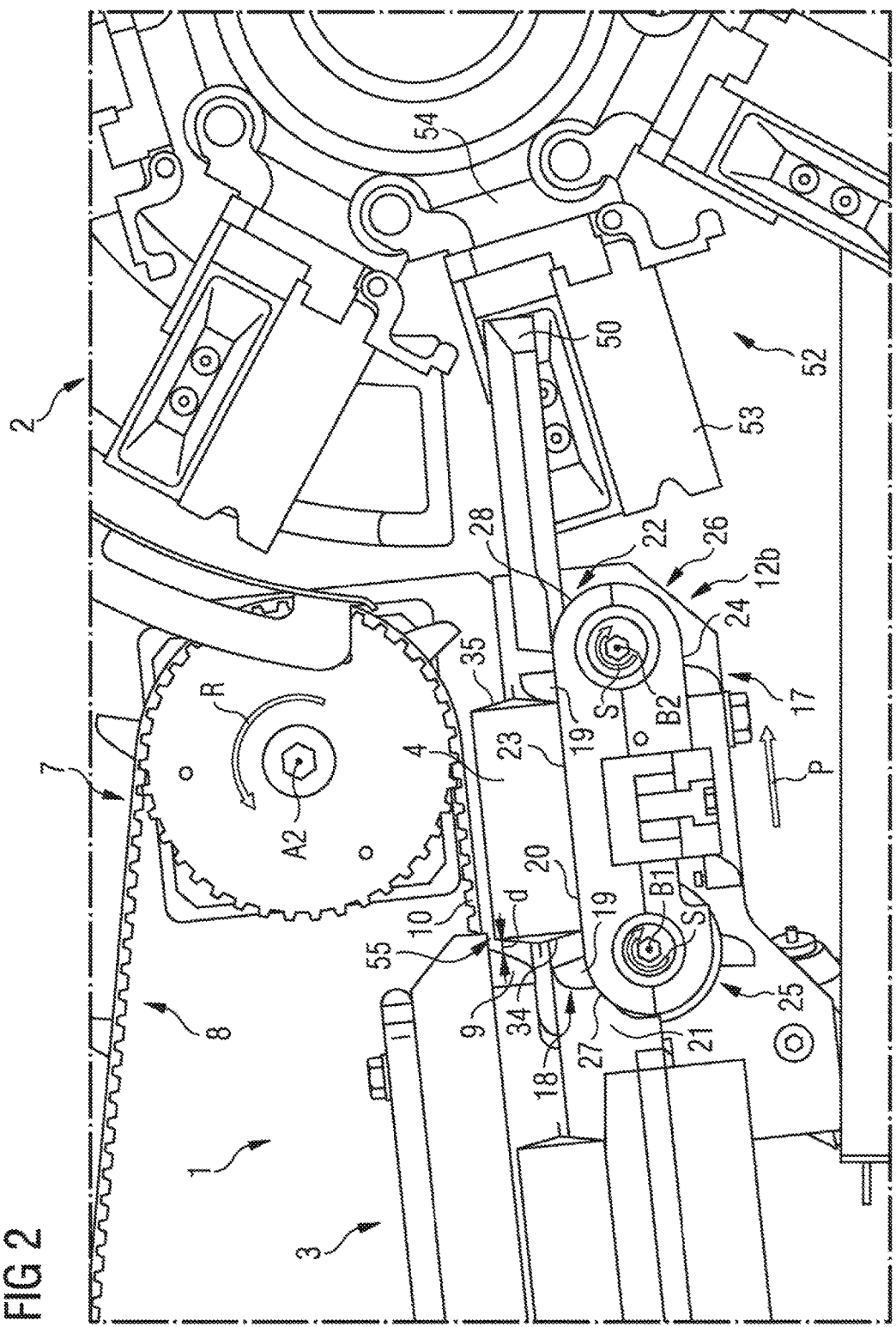
FIG. 2 is a side view of the feeding unit of FIG. 1, showing the feeding unit in a first operating position.

When it reaches the outlet region 12b, the pack 4—in particular the first end portion 34—may be in contact with the corresponding carrying element 9 or separated, i.e. at a certain distance d, from the corresponding carrying element 9 (as shown in FIG. 2).

In the first case, the pack 4—in particular the second end portion 35—substantially does not interact with the respective braking element 19. The carrying element 9 delivers the pack 4 to a paddle 53 in a synchronized way.

Figure 3:
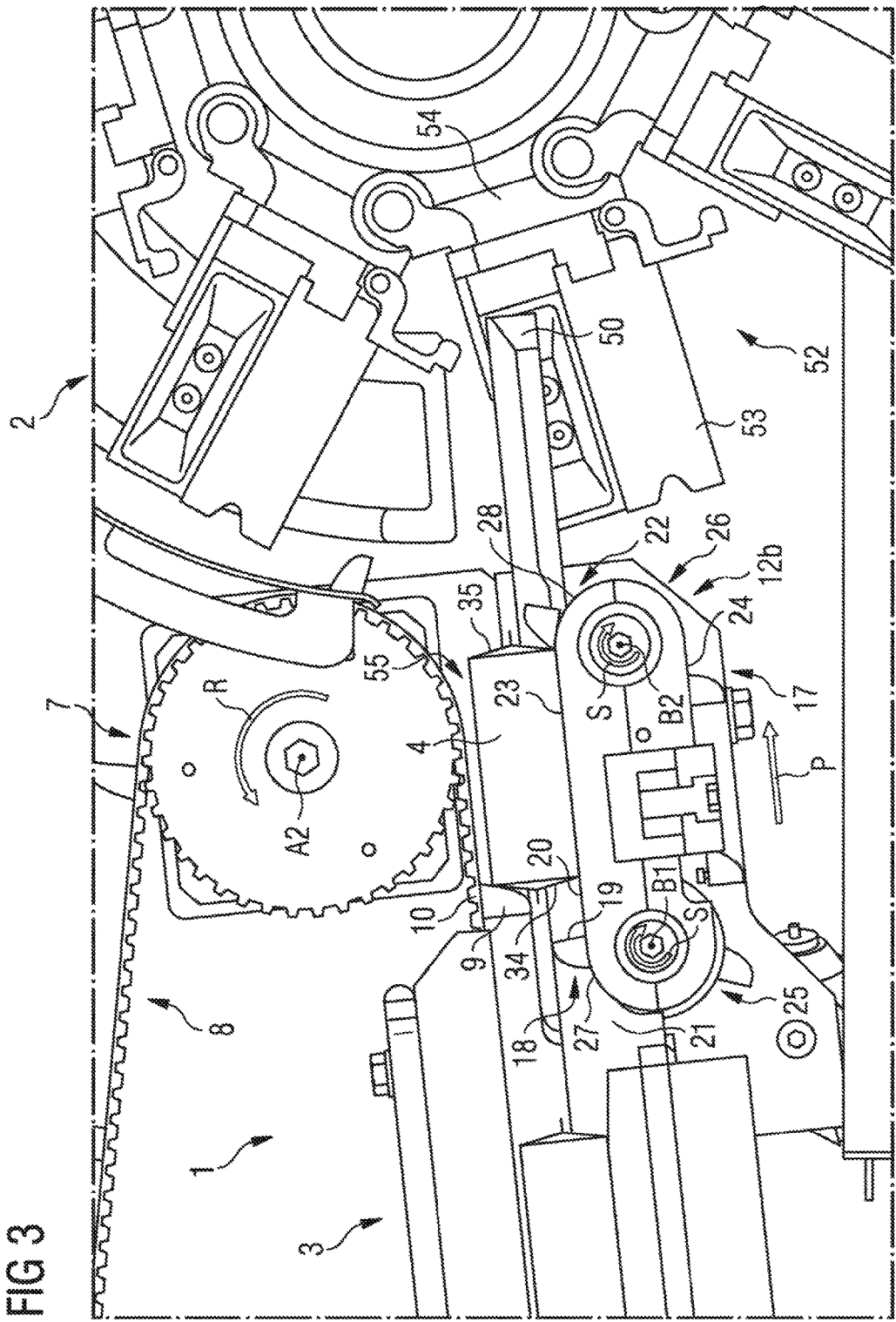
FIG. 3 is a side view of the feeding unit of FIG. 1, showing the feeding unit in a second operating position.
Figure 4:
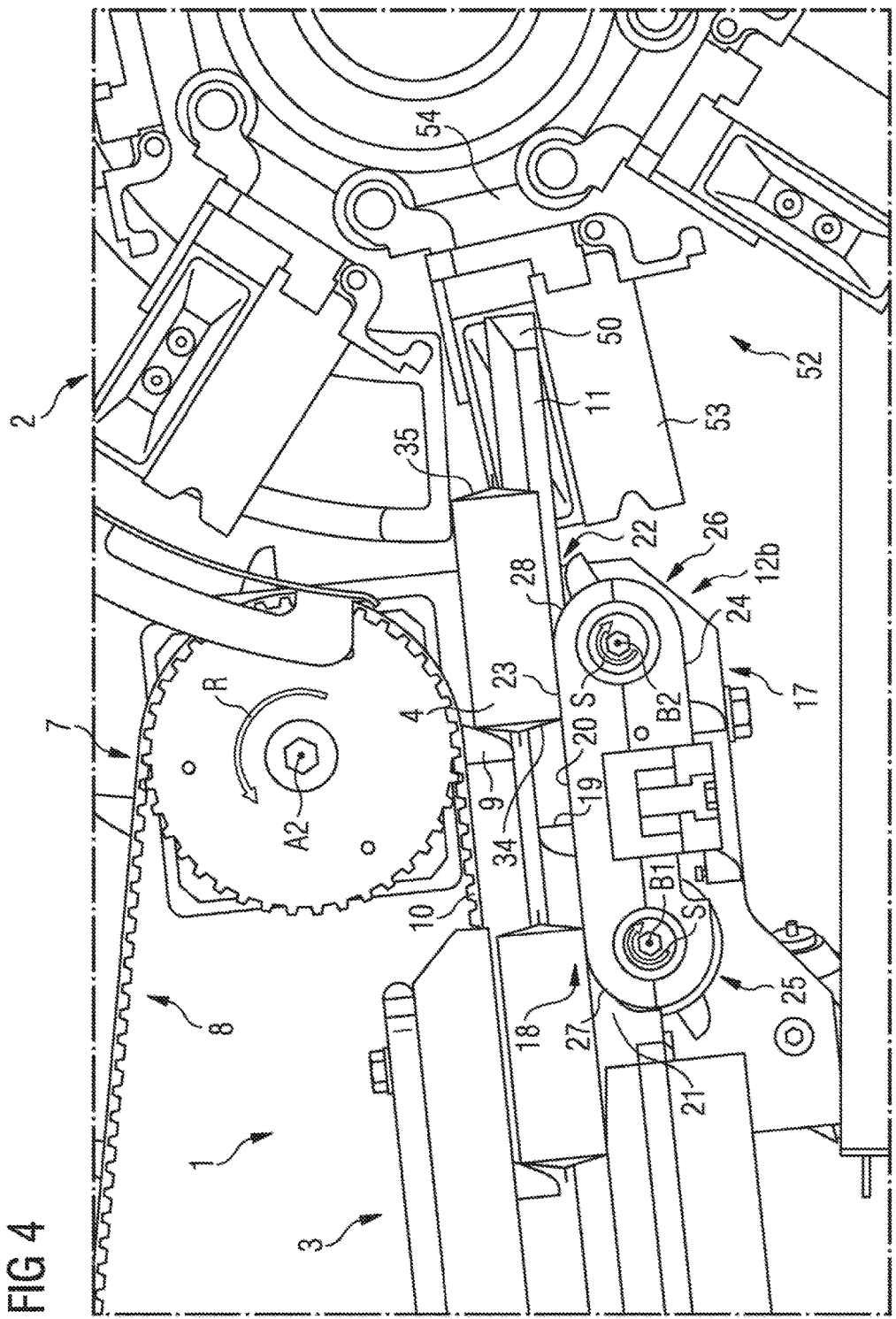
FIG. 4 is a side view of the feeding unit of FIG. 1, showing the feeding unit in a third operating position.

In the second case, as shown in FIGS. 2 and 3, the pack 4—in particular the second end portion 35—interacts with the respective braking element 19 that decelerates the pack 4 until the pack 4—in particular the first end portion 34—abuts against the corresponding carrying element 9. At this point, as shown in FIG. 4, the carrying element 9 delivers the pack 4 to a paddle 53 in a synchronised way.

The carrying element 9 and the braking element 19 cooperating with the same pack 4 define a compartment 55 within which the pack 4 is received. This prevents the pack 4 from interacting with the chain conveyor 52 too early. Due to the compartment 55 the position of the pack 4 at the outlet region 12b is very precise.

Owing to the invention it is possible to obtain a feeding unit that allows good synchronization of the packs.

The braking elements 19, in fact, assure that the packs 4 abut against the carrying element 9 so as to be properly released to the folding unit 2.

The braking elements 19 are driven at a controlled speed and therefore interact with the packs 4 in a very repeatable way. In particular, the interaction between the braking elements 19 and the packs 4 does not depend on the environment in which the packaging machine is installed, in particular on the friction between the packs 4 and the guide arrangement 11.

In addition, the braking elements 19 are not "passive decelerating means" arranged in a fixed position and merely pushing the packs whilst the packs are in motion (like the brushes and springs of the known feeding units).

On the contrary, the braking elements are "active decelerating means" whose speed and position—owing to the driving arrangement and the further driving arrangement—matches the position and speed of the carrying elements 9.

In this way, the braking action is very reliable, even in case of high speed packaging machines.

Moreover, the braking elements 19 may be made with an easily cleanable material. In this way, the braking conveyor 17 is very hygienic.

In addition, the braking elements 19 may be made, or covered, with a soft material. In this way, the braking conveyor 17 does not damage the packages.

Clearly, changes may be made to the feeding unit 3 as described and illustrated herein without, however, departing from the scope defined in the accompanying claims.

The invention claimed is:

1. A feeding unit for receiving sealed packs from a forming unit arranged to form said packs and feed said packs to a folding unit arranged to fold said packs so as to obtain folded packages, said feeding unit comprising a feeding conveyor having at least one carrying element arranged for delivering said packs to said folding unit at an outlet region of said feeding unit by conveying said packs along a conveying path in a conveying direction;

each of said packs comprising a main body, a leading end portion, and a trailing end portion opposite said leading end portion, said main body possessing a longitudinal direction extending in said conveying direction when said pack is being conveyed and a thickness direction extending transverse to said conveying direction when said pack is being conveyed, said main body comprising a first lateral surface and a second lateral surface opposite said first lateral surface in said thickness direction;

said feeding unit further comprising a braking conveyor arranged for slowing down said packs so that said packs are kept in contact with said at least one carrying element at said outlet region, said second lateral surface of said pack being closer to said braking conveyor than said first lateral surface of said pack when said pack is being conveyed; and said braking conveyor comprising at least one braking element configured to extend into said conveying path beyond said second lateral surface of said pack in said thickness direction of said pack to contact said leading end portion of said pack to slow down said pack.

2. A feeding unit according to claim 1, wherein said feeding conveyor comprises a flexible conveying element supporting said at least one carrying element and said braking conveyor comprises a flexible conveying arrangement supporting said at least one braking element.

3. A feeding unit according to claim 2, and further comprising a drive arrangement for driving said flexible conveying arrangement at an advancing speed and a further driving arrangement for driving said flexible conveying element at a further advancing speed, said driving arrangement and said further driving arrangement being so configured that said advancing speed is lower than said further advancing speed.

4. A feeding unit according to claim 2, and further comprising a guide arrangement arranged to guide said packs towards said folding unit.

5. A feeding unit according to claim 4, wherein said flexible conveying arrangement and said flexible conveying element are arranged on opposite sides of said guide arrangement.

6. A feeding unit according to claim 5, wherein said guide arrangement defines a substantially horizontal plane, said flexible conveying arrangement being positioned below said guide arrangement and said flexible conveying element being positioned above said guide arrangement.

7. A feeding unit according to claim 4, wherein said guide arrangement comprises a first guide element and a second guide element positioned on opposite sides of said flexible conveying arrangement so that a gap is defined between said first guide element and said second guide element, said at least one braking element projecting through said gap to interact with said packs.

8. A feeding unit according to claim 2, wherein said at least one braking element is arranged to interact with an end portion of a pack and said at least one carrying element is arranged to interact with a further end portion of said pack opposite to said end portion.

9. A feeding unit according to claim 8, wherein said at least one braking element and said at least one carrying element cooperate, at said outlet region, to define a compartment receiving said pack.

10. A feeding conveyor according to claim 2, wherein said braking conveyor comprises a plurality of said braking elements equally spaced along said flexible conveying arrangement.

11. A feeding conveyor according to claim 2, wherein said feeding conveyor comprises a plurality of said carrying elements equally spaced along said flexible conveying element.

12. The feeding unit according to claim 1, wherein
the feeding conveyor possesses an inlet end, an outlet end and a midpoint located between the inlet and outlet ends, and
the braking conveyor is positioned entirely beyond the midpoint of the feeding conveyor.

13. A feeding unit for receiving sealed packs from a forming unit that forms the sealed packs and for feeding the packs to a folding unit that folds the packs to produce folded packages, the feeding unit comprising:
an endless feed belt connected to a first drive to move the endless feed belt along an advancing path, the endless feed belt possessing an inlet end at which the packs from the folding unit are received on the endless feed belt and an outlet end at which the packs which have advanced in an advancing direction along the advancing path from the inlet end leave the endless feed belt to be transferred to the folding unit;
the endless feed belt being provided with a plurality of carrying elements that project from the belt, move together with the belt and are spaced apart along the belt at equal spacing to each abut against a respective one of the packs;
the endless feed belt possessing a midpoint located between the inlet and outlet ends;
an endless braking belt spaced apart from the endless feed belt and at least partially overlapping the endless feed belt so that sealed packs on the endless feed belt that are being advanced toward the outlet end pass between the endless braking belt and the endless feed belt;
the endless braking belt being connected to a second drive configured to drive the endless braking belt at an advancing speed less than an advancing speed of the endless fee belt;
the endless braking belt possessing opposite ends both located downstream of the midpoint of the endless feed belt; and
the endless braking belt being provided with a plurality of braking elements that project from the endless braking belt, move together with the endless braking belt and are spaced apart along the endless braking belt to each abut against individual ones of the packs to slow down the packs and maintain abutment of each pack with the respective carrying element.

14. A feeding unit according to claim 13, further comprising first and second guide elements positioned on opposite sides of the endless feed belt to guide the packs toward the outlet end of the endless feed belt.

15. A feeding unit according to claim 14, wherein the endless feed belt and the endless braking belt are positioned on opposite sides of the first and second guide elements.

16. A feeding unit according to claim 14, wherein the endless feed belt and the endless braking belt are horizontally arranged, and the first and second guide elements are horizontally arranged, the endless feed belt being positioned above the first and second guide elements, and the endless braking belt being positioned below the first and second guide elements.

17. A feeding conveyor according to claim 13, wherein the braking elements are equally spaced along the endless braking belt.

18. A feeding unit for receiving sealed packs from a forming unit arranged to form the packs and feed the packs to a folding unit arranged to fold the packs to obtain folded packages, the feeding unit comprising:
a feeding conveyor having at least one carrying element arranged for delivering the packs to the folding unit at an outlet region of the feeding unit by conveying the packs along a conveying path in a conveying direction, the feeding conveyor being positioned above the packs when the packs are being conveyed by the at least one carrying arrangement; and
a braking conveyor arranged for slowing down the packs so that the packs are kept in contact with the at least one carrying element at the outlet region; and
the braking conveyor is positioned on an opposite side of the packs relative to the feeding conveyor in a transverse direction to the conveying direction such that the braking conveyor is positioned below the packs when the packs are being conveyed by the at least one carrying element.

19. The feeding unit according to claim 18, wherein
the feeding conveyor possesses an inlet end, an outlet end and a midpoint located between the inlet and outlet ends, and
the braking conveyor is positioned entirely beyond the midpoint of the feeding conveyor.

* * * * *